United States Patent
Chandramohan et al.

(10) Patent No.: US 8,407,646 B2
(45) Date of Patent: Mar. 26, 2013

(54) ACTIVE NET AND PARASITIC NET BASED APPROACH FOR CIRCUIT SIMULATION AND CHARACTERIZATION

(75) Inventors: Sateesh Chandramohan, Karnataka (IN); Vikram Avaral, Karnataka (IN)

(73) Assignee: Synopsys, Inc., Mountain View, CA (US)

( * ) Notice: Subject to any disclaimer, the term of this patent is extended or adjusted under 35 U.S.C. 154(b) by 179 days.

(21) Appl. No.: 12/704,048

(22) Filed: Feb. 11, 2010

(65) Prior Publication Data

US 2011/0197170 A1     Aug. 11, 2011

(51) Int. Cl.
   *G06F 17/50*     (2006.01)
(52) U.S. Cl. .................. 716/126; 716/119; 716/122
(58) Field of Classification Search .............. 716/100, 716/102, 113, 115, 134, 136, 119, 122, 126
   See application file for complete search history.

(56) References Cited

U.S. PATENT DOCUMENTS

| | | | |
|---|---|---|---|
| 6,249,901 B1 * | 6/2001 | Yuan et al. | 716/103 |
| 7,206,731 B2 * | 4/2007 | Sercu et al. | 703/14 |
| 7,325,210 B2 * | 1/2008 | Rao et al. | 716/113 |
| 2007/0094622 A1 * | 4/2007 | Lee et al. | 716/4 |

OTHER PUBLICATIONS

SRAM Compilers Timing Analysis Using Active-Net Based HSIM-Star-RCXT Flow, Snug Conference India, Jul. 2009, pp. 1-18.

* cited by examiner

*Primary Examiner* — Vuthe Siek
*Assistant Examiner* — Mohammed Alam
(74) *Attorney, Agent, or Firm* — Kenta Suzue; Haynes Beffel & Wolfeld LLP

(57) ABSTRACT

A computer system identifies active nets in a netlist of a circuit design by performing simulation of the netlist. Active nets are interconnections between circuit components showing a level of activity during the simulation. The computer system extracts, from a layout of the circuit design, a parasitic netlist of a part of the circuit design, where the part determined by the active nets. The parasitic netlist is a list of parasitic nets, or unwanted circuit interconnections that are unavoidable adjuncts of the active nets. The computer system performs simulation of the circuit design including the netlist of a circuit design and the parasitic netlist of the part of the circuit design.

25 Claims, 6 Drawing Sheets

ACTIVE NET AND PARASITIC NET BASED APPROACH FOR CIRCUIT SIMULATION AND CHARACTERIZATION

BACKGROUND

1. Field of the Invention

This technology relates to accurate characterization of a circuit, such as memory, by simulation.

2. Description of Related Art

Memory characterization can be done using a modeled critical path methodology. With new MOS (metal oxide semiconductor) layout effects, it is important to characterize the memory with the completely extracted netlist. But extraction run times and simulation run times can be prohibitively high. Run times exceed 5 days and memory footprints are 50 GB. Although this instance based approach is useful for accuracy, the extraction run times and simulator run times are so long that this instance based approach is impractical.

SUMMARY

One aspect of the technology is a circuit design method for use by a computer system having a processor and memory. Example tools used in the method are HSIM and Star-RC. Steps include:

The computer system identifying active nets in a netlist of a circuit design by performing simulation of the netlist.

The computer system extracting, from a layout of the circuit design, a parasitic netlist of a limited part of the circuit design, the limited part determined by the active nets;

The computer system performing simulation of the circuit design including the netlist of a circuit design and the parasitic netlist of the limited part of the circuit design.

Various embodiments more specifically define how to identify the active nets during simulation of the netlist, by defining a minimum voltage transition of an active net during simulation of the netlist. In one embodiment, the minimum voltage transition has a predetermined minimum magnitude during said identifying. In another embodiment, the minimum voltage transition has a minimum magnitude of a predetermined fraction of a supply voltage of the circuit design during said identifying. In yet another embodiment, the minimum voltage transition of a minimum magnitude of between one tenth and one twelfth of a supply voltage of the circuit design during said identifying. This fraction of the supply voltage is intricately linked to the Design of Experiment described below.

Various embodiments more specifically define how to identify the limited part of the circuit design determined by the active nets, such that a parasitic netlist is extracted from a layout of this limited part of the circuit design. In one embodiment, the limited part is determined by the active nets such that the parasitic netlist includes parasitics of the active nets. In one embodiment, the limited part is determined by the active nets such that the parasitic netlist includes parasitic grounded capacitances of the active nets. In one embodiment, the limited part is determined by the active nets such that the parasitic netlist includes parasitic coupled capacitances of the active nets. In one embodiment, the limited part is determined by the active nets such that the parasitic netlist includes parasitics of the active nets and parasitics of additional nets, the additional nets being next to the active nets. In one embodiment, the limited part is determined by the active nets such that the parasitic netlist includes parasitic resistance and parasitic capacitance of the active nets and parasitic capacitance of additional nets directly connected to the parasitics of the active nets, the additional nets being next to the active nets. In one embodiment, the limited part is determined by the active nets such that the parasitic netlist includes parasitic resistance and parasitic capacitance of the active nets and parasitic capacitance of additional nets directly connected to the parasitics of the active nets.

In some embodiments, the circuit design is a memory

Another aspect of the technology is a circuit design method for use by a computer system having a processor and memory.

The computer system performs simulation of a circuit design including a netlist of the circuit design and a parasitic netlist of a limited part of the circuit design, the limited part being determined by active nets of a netlist of the circuit design, and the parasitic netlist of the limited part of the circuit design being extracted from a layout of the circuit design.

Another aspect of the technology is a computer readable medium storing computer instructions to perform a circuit design method for use by a computer system. The computer instructions comprise:

Computer instructions executable by the computer system identifying active nets in a netlist of a circuit design by performing simulation of the netlist;

Computer instructions executable by the computer system extracting, from a layout of the circuit design, a parasitic netlist of a limited part of the circuit design, the limited part determined by the active nets;

Computer instructions executable by the computer system performing simulation of the circuit design including the netlist of a circuit design and the parasitic netlist of the limited part of the circuit design.

Another aspect of the technology is a computer readable medium storing computer instructions to perform a circuit design method for use by a computer system. The computer instructions comprise:

Computer instructions executable by the computer system performing simulation of a circuit design including a netlist of the circuit design and a parasitic netlist of a limited part of the circuit design, the limited part being determined by active nets of a netlist of the circuit design, and the parasitic netlist of the limited part of the circuit design being extracted from a layout of the circuit design.

Another aspect of the technology is a computer system, comprising processing resources and memory resources.

Computer instructions in the memory resources are executable by the processing resources of the computer system identifying active nets in a netlist of a circuit design by performing simulation of the netlist.

Computer instructions in the memory resources are executable by the processing resources of the computer system extracting, from a layout of the circuit design, a parasitic netlist of a limited part of the circuit design, the limited part determined by the active nets.

Computer instructions in the memory resources are executable by the processing resources of the computer system performing simulation of the circuit design including the netlist of a circuit design and the parasitic netlist of the limited part of the circuit design.

Another aspect of the technology is a computer system, comprising processing resources and memory resources.

Computer instructions in the memory resources executable by the computer system performing simulation of a circuit design including a netlist of the circuit design and a parasitic netlist of a limited part of the circuit design, the limited part being determined by active nets of a netlist of the circuit design, and the parasitic netlist of the limited part of the circuit design being extracted from a layout of the circuit design. An example of a set of Design of Experiment procedures on how to arrive at a good set of HSIM options is discussed below.

DETAILED DESCRIPTION

Figure 1:
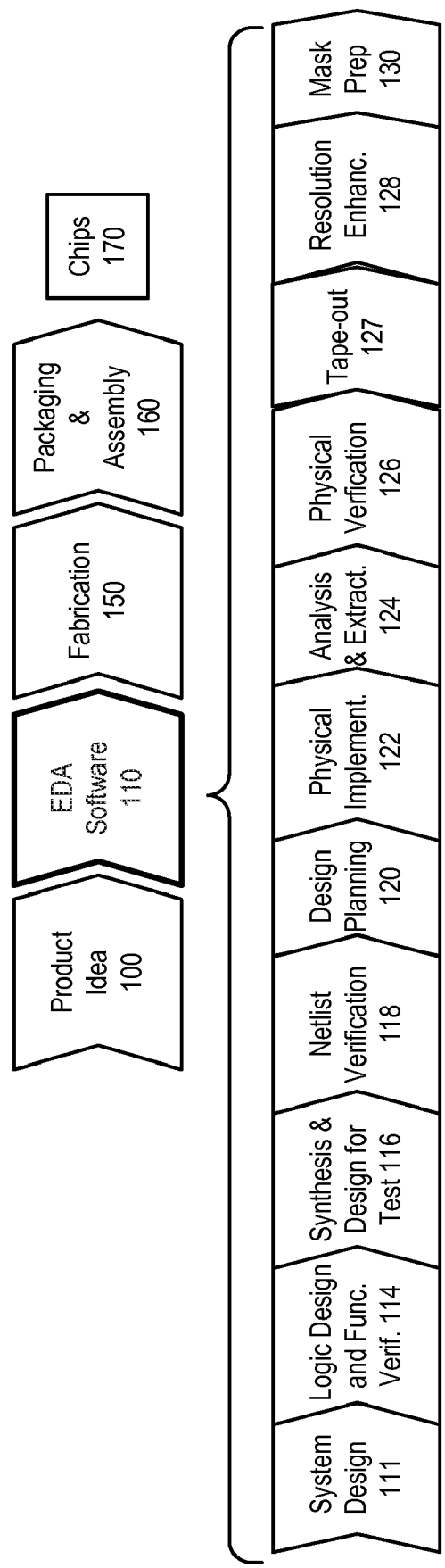
FIG. 1 shows a simplified representation of an illustrative integrated circuit design flow incorporating features of the technology.

FIG. 1 shows a simplified representation of an illustrative integrated circuit design flow incorporating features of the technology. At a high level, the process starts with the product idea (step 100) and is realized in an EDA (Electronic Design Automation) software design process (step 110). When the design is finalized, it can be taped-out (step 140). After tape out, the fabrication process (step 150) and packaging and assembly processes (step 160) occur resulting, ultimately, in finished integrated circuit chips (result 170).

The EDA software design process (step 110) is actually composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and IC Compiler products.

Physical implementation (step 122): The placement (positioning of circuit elements) and routing (connection of the same) occurs at this step. Example EDA software products from Synopsys, Inc. that can be used at this step include the Astro and IC Compiler products.

Analysis and extraction (step 124): At this step, the circuit function is verified at a transistor level, this in turn permits what-if refinement. Example EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Example EDA software products from Synopsys, Inc. that can be used at this step include the Hercules product.

Tape-out (step 127): This step provides the "tape out" data for production of masks for lithographic use to produce finished chips. Example EDA software products from Synopsys, Inc. that can be used at this step include the CATS(R) family of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask data preparation (step 130): This step provides the "tape-out" data for production of masks for lithographic use to produce finished chips. Example EDA software products from Synopsys, Inc. that can be used at this step include the CATS(R) family of products.

Figure 2:
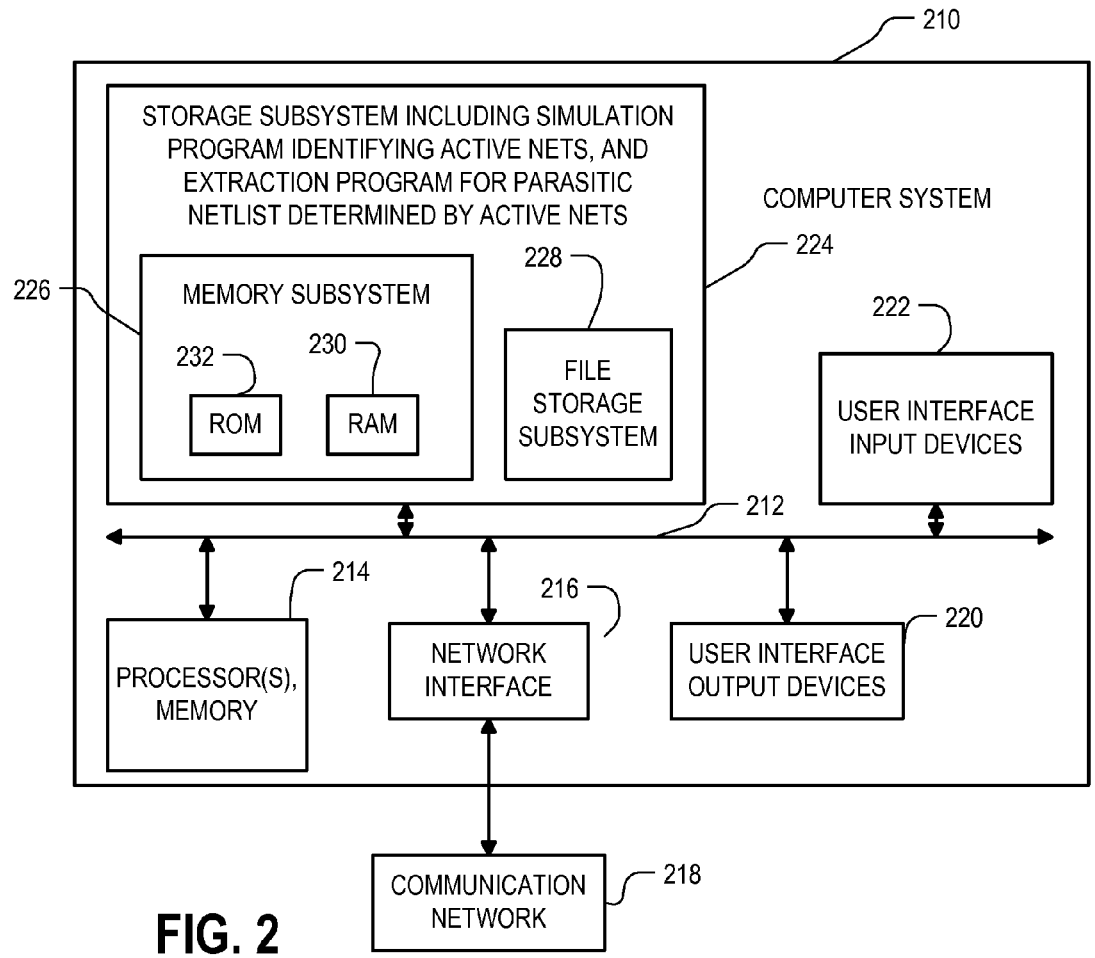
FIG. 2 is a simplified block diagram of a computer system that can be used to implement software incorporating aspects of the technology.
Figure 2A:
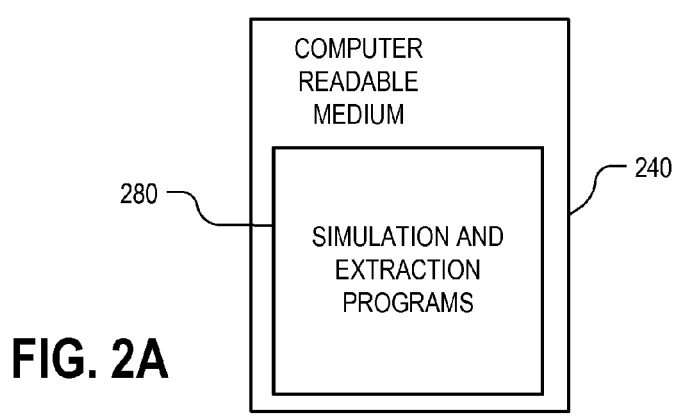

FIG. 2 is a simplified block diagram of a computer system that can be used to implement software incorporating aspects of the technology.

Computer system 210 typically includes a processor subsystem 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information. While in one embodiment, communication network 218 is the Internet, in other embodiments, communication network 218 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto computer network 218.

User interface output devices 220 may include a display subsystem, a printer, a fax machine, or non visual displays such as audio output devices. The display subsystem may include a cathode ray tube (CRT), a flat panel device such as a liquid crystal display (LCD), a projection device, or some other mechanism for creating a visible image. The display subsystem may also provide non visual display such as via audio output devices. In general, use of the term "output device" is intended to include all possible types of devices and ways to output information from computer system 210 to the user or to another machine or computer system.

Storage subsystem 224 stores the basic programming and data constructs that provide the functionality of certain aspects of the present invention. For example, the various modules implementing the functionality of a circuit simulator and extraction tool in the present application may be stored in storage subsystem 224. These software modules are generally executed by processor subsystem 214. The data constructs stored in the storage subsystem 224 also can include any technology files, macrocell libraries, layout files, and other databases mentioned herein. Note that in some embodiments, one or more of these can be stored elsewhere but accessibly to the computer system 210, for example via the communication network 218.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. The simulation and extraction programs 280 implementing the functionality of certain embodiments of the invention may have been provided on a computer readable medium including transitory media, and nontransitory media 240 such as one or more CD-ROMs (or may have been communicated to the computer system 210 via the communication network 218), and may be stored by file storage subsystem 228. The host memory 226 contains, among other things, computer instructions which, when executed by the processor subsystem 210, cause the computer system to operate or perform functions as described herein. As used herein, processes and software that are said to run in or on "the host" or "the computer", execute on the processor subsystem 214 in response to computer instructions and data in the host memory subsystem 226 including any other local or remote storage for such instructions and data.

Bus subsystem 212 provides a mechanism for letting the various components and subsystems of computer system 210 communicate with each other as intended. Although bus subsystem 212 is shown schematically as a single bus, alternative embodiments of the bus subsystem may use multiple busses.

Computer system 210 itself can be of varying types including a personal computer, a portable computer, a workstation, a computer terminal, a network computer, a television, a mainframe, or any other data processing system or user device. Due to the ever changing nature of computers and networks, the description of computer system 210 depicted in FIG. 2 is intended only as a specific example for purposes of illustrating the preferred embodiments of the present invention. Many other configurations of computer system 210 are possible having more or less components than the computer system depicted in FIG. 2.

Figure 3:
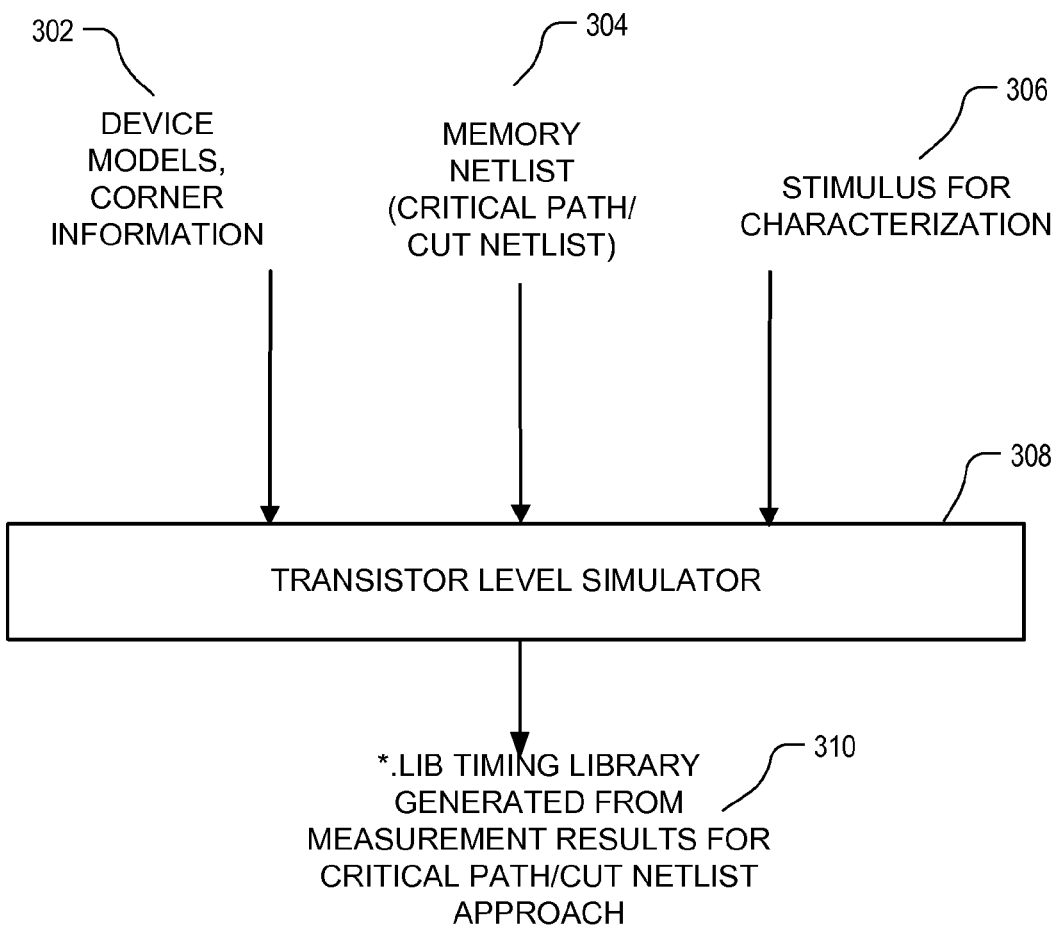
FIG. 3 is a simplified process flow of characterizing a memory based on the critical path, or cut netlist, approach.
Figure 4:
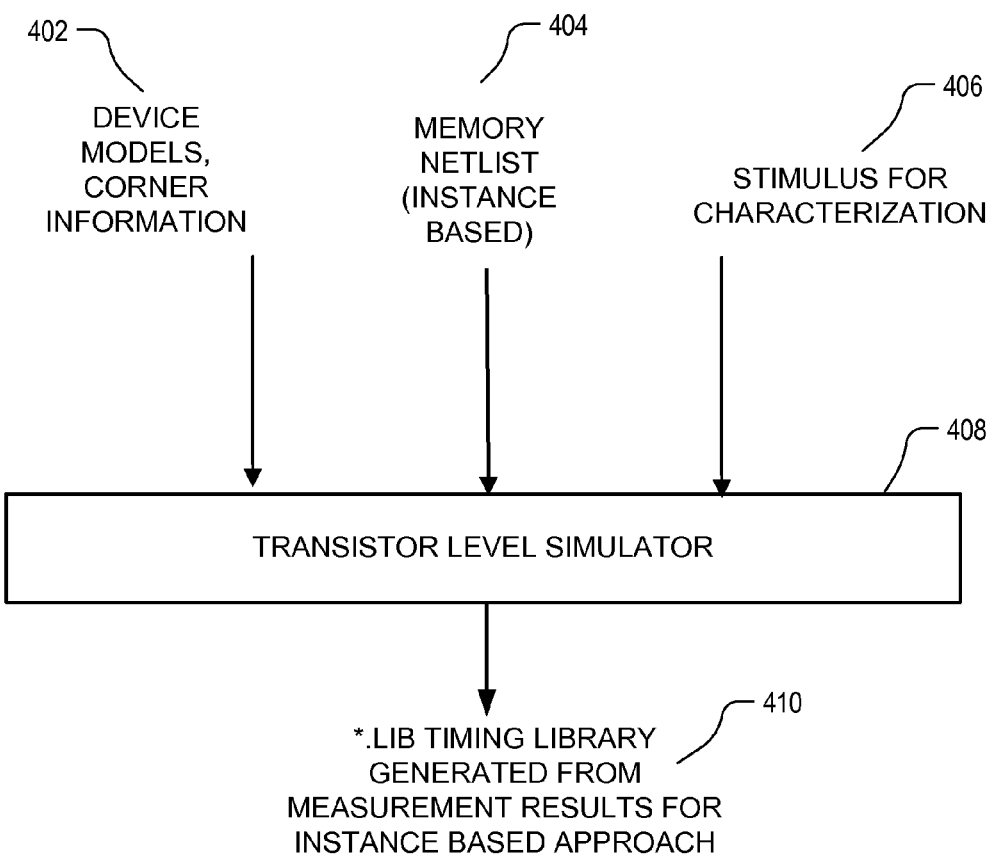
FIG. 4 is a simplified process flow of characterizing a memory based on the instance based approach.

The process flows of FIGS. 3 and 4 are commonly used to characterize circuits such as memories. Embedded memories are an important type of manufactured chips, with increasing complexity and size, and increasing number in a typical SoC (System on Chip). For predictable timing closure, accurate timing characterization is a requirement. Characterization is a process of generating timing libraries from SPICE circuit simulations. The timing libraries generated from the SPICE simulations are as accurate as the input netlist and model undergoing simulation. A typical memory characterization process runs different SPICE simulations for different input slews and output loads. The outputs of all the simulations that capture the various parameters are used to populate the *.lib which is used by downstream implementation and timing tools.

FIG. 3 is a simplified process flow of characterizing a memory based on the critical path, or cut netlist, approach.

Device models and corner information 302, memory netlist (critical path or cut netlist) 304, and stimulus for characterization 306 are inputs of the transistor level simulator 308. As output, the transistor level simulator 308 generates *.lib timing library 310 from measurement results for the critical path or cut netlist approach.

In the critical path or cut netlist approach, the memory designers model the interconnect parasitics using parameters of sheet resistance and routing length. This reduces the number of devices that need to be simulated and reduces the size of the netlist that is simulated. The netlist used for characterizing the memory is a modeled netlist where parasitics aren't extracted from layout, but are modeled based on the dimensions of cells and length of metal wire plus the sheet resistance of the layer used for routing.

Advantages of the critical path or cut netlist approach are its scalability because the number of devices in the netlist aren't directly proportional to the design size or size of the memory, and simple setup because the routing capacitance and resistance are functions of the bit cell width and the sheet resistance of the routing layer.

Disadvantages of the critical path or cut netlist approach are the lack of a one-to-one correlation between the netlist used for characterization and the silicon layout; no accounting for layout effects that are key for UDSM (ultra deep sub-micron) nodes such as 45 nm, 32 nm, 28 nm, and so on; and a potential performance mismatch between the actual netlist and the characterized netlist.

FIG. 4 is a simplified process flow of characterizing a memory based on the instance based approach.

Device models and corner information 402, memory netlist (instance based) 404, and stimulus for characterization 406 are inputs of the transistor level simulator 408. As output, the transistor level simulator 408 generates *Jib timing library 410 from measurement results for the instance based approach.

In the instance based approach, the netlist used for simulating and characterizing the memory is extracted from the layout and therefore based on what goes into silicon or the exact design Advantages of the instance based approach are that the netlist is generated from an actual design, resulting in a one-to-one correspondence between the netlist used for characterization and the real design; the characterization is very close to the silicon numbers because the netlist is extracted from the layout; and layout effects are accounted for that are predominant in the advanced process nodes (45 nm, 32 nm, 28 nm, and so on).

The disadvantage of the instance based approach is that the netlist size, simulation runtime, and memory footprint are directly proportional to the size of the memory, hence making the approach not scalable.

Figure 5:
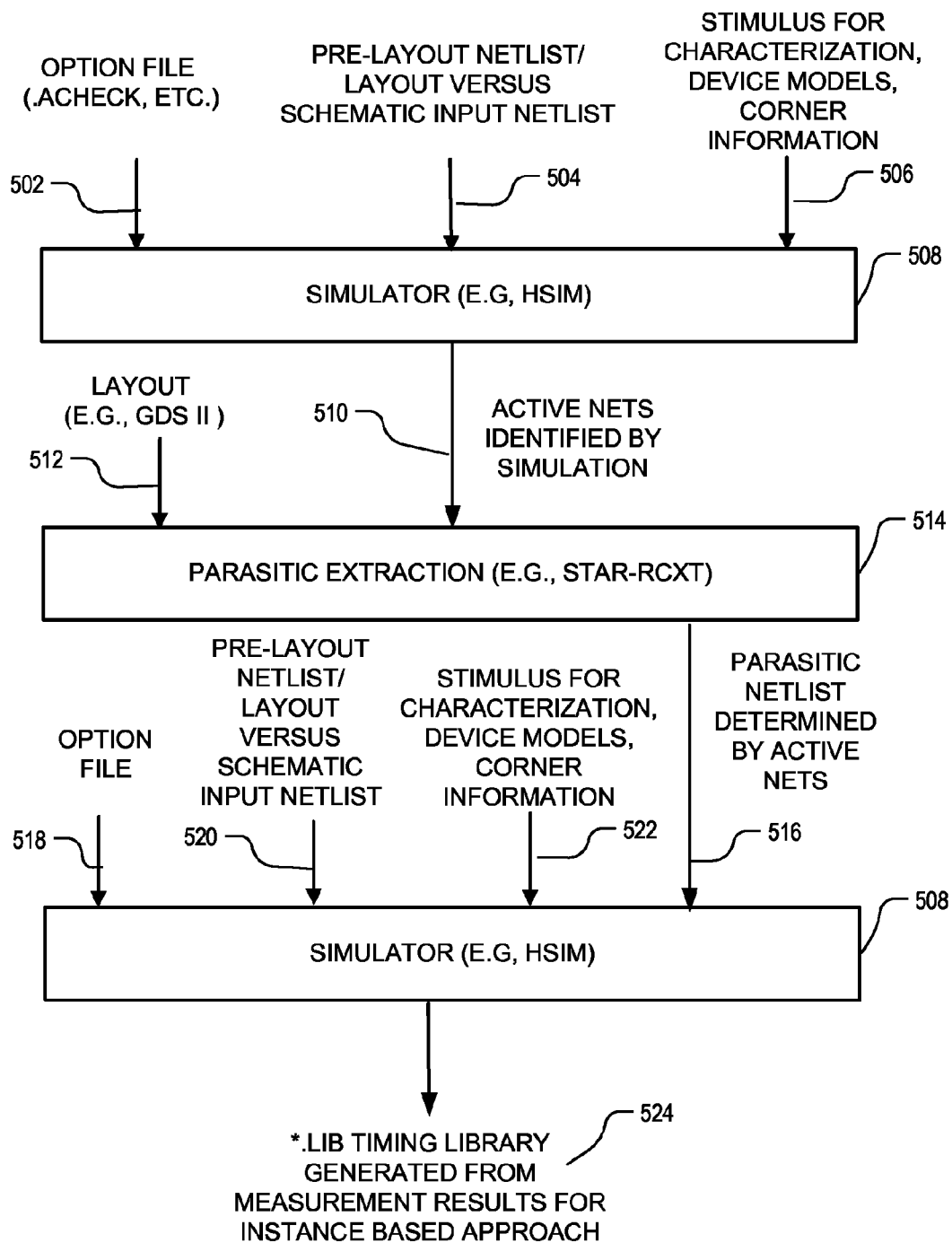
FIG. 5 is a simplified process flow of characterizing a memory based on the instance based approach, including simulation to determine active nets, extraction from a limited part of a layout of a parasitic netlist determined by the active nets, and simulation including the parasitic netlist.

FIG. 5 is a simplified process flow of characterizing a memory based on the instance based approach, including simulation to determine active nets, extraction from a limited part of a layout of a parasitic netlist determined by the active nets, and simulation including the parasitic netlist.

The size of the netlist is directly proportional to the memory size, but for any given memory write or read operation, the nets that control the timing are a small subset of the total number of nets in the memory.

The extraction data size grows exponentially as memory sizes increase. But the number of nets that are active remain largely the same for a given register size (width). Accordingly, this results in significant reduction of data size.

Instead of extracting all nets, a combination of a circuit simulator and parasitic extraction tool extracts nets that are active, and adjacent nets that are connected to active nets. As a result, simulation run times are reduced by 100× and simulator memory by 20×. A similar improvement is seen in the extraction tool. Such improvements comes with practically no loss in accuracy.

Option file (.acheck command to identify active nets, etc.) 502, pre-layout netlist or LVS (layout versus schematic) input netlist 504, and stimulus for characterization, device models, and corner information 506 are inputs of the transistor level simulator 508 (e.g., HSIM). As output, the transistor level simulator 508 generates active nets identified by simulation 510.

The HSIM commands used to identify the active nets are as follows:

.acheck "*" dv="vdd/10"—This command helps the tool identify nets in the design with a voltage transition of at least $\frac{1}{10}$th the supply during the entire period of simulation. Other criteria may be used.

.param HSIMACHECKOUTFMT=1—This command generates the list of active nets in the format that can be consumed by Star-RC.

The following explains how to arrive at the best HSIM options for a given technology node. This section also explains an example of how to identify the criteria that will determine active nets.

Criteria to Identify a Small Block

The block should be small—can contain a few hundred of devices. More devices will increase the turnaround time without adding significant value.

The block could either be a synthetic block (created just for this purpose) or a small functional part of the memory. An ideal block from the memory would be the address decoder block.

An important requirement is to use the extracted netlist (with R's and C's.)

HSPICE is a golden standard and recommended to generate the golden results.

HSIM is recommended for instance based characterizations due to the architecture of HSIM and its hierarchical database.

HSIM Option tuning process

Generate golden results by simulating the netlist chosen with the above criteria using HSPICE.

Run the simulation on the same netlist using HSIM. The HSIM options are chosen such that the HSIM simulation results match HSPICE simulation results.

HSIMALLOWEDDV is one of the HSIM options that control the accuracy of the simulation and determined whether a net is active/switching; other HSIM options can be tweaked to arrive at the desired accuracy. HSIMALLOWEDDV would be the key parameter that would be used The value of HSIMALLOWEDDV defines the value of the voltage transition which defines which nets are active.

This helps determination of the most accurate options to be used for HSIM with which HSIM results match HSPICE results.

The HSIM options can be made less conservative to gain performance by creating a tolerance band of +/−1.5% (+/−3%) for timing.

These active nets identified by simulation 510, and a layout (e.g., GDS II) are inputs to a parasitic extraction tool (e.g., Start-RCXT) 514. As output, the parasitic extraction tool 514 generates a parasitic netlist determined by the active nets 516.

The Star-RC commands used for extraction are as follows:

NETLIST_SELECT_NET:<list of active nets>—This command identifies the nets that needs to be extracted.

NETLIST_COUPLED_UNSELECTED_NETS: complete—This command ensures that the nets coupled to active nets are extracted too.

NETLIST_TYPE: RCc—This command ensure that all nets that are extracted are written out as RC extracted.

The timing of the active net is dependent on the coupling capacitance Cc connected between the active net and the additional net. Since the capacitance is captured in the DSPF (Detailed Standard Parasitic Format) the loading of the additional net is reflected on the active net.

The following explains how Star-RC can be used to write out the active nets and nets coupled to active nets as distributed RC.

Nets to be Extracted:

Extracting only the active nets yields less accurate results, as the coupling from the adjacent nets aren't accounted for. To address this issue, one embodiment extracts the active nets and the nets coupled to active nets.

The commands that can accomplish the above in Star-RC are listed below:
 NETLIST_SELECT_NET:<list of active nets>
 NETLIST_COUPLED_UNSELECTED_NETS: complete
 NETLIST_TYPE: RCc*

The DSPF file size s further optimized by extracting the coupled nets as C instead of RC. This impacts accuracy but results in reduction of file size.

The commands that can accomplish the above in Star-RC are listed below:
 NETLIST_SELECT_NETS:<list of active nets>
 NETLIST_COUPLE_UNSELECTED_NETS: COMPLETE
 NETLIST_TYPE: Cc*
 NETLIST_TYPE: RCc<list of active nets>

The capacitive load of the additional net is reflected on the active net, in this case but the RC delay is missing in this case.

This parasitic netlist determined by the active nets 516, an option file 518, the pre-layout netlist or LVS (layout versus schematic) input netlist 520, and stimulus for characterization, device models, and corner information 522 are inputs of the transistor level simulator 508. The option file 518 is similar to the option file 502, but does not require the .acheck option, because the desired output does not require the active netlist. The input netlist 520 is similar to the input netlist 504, but may be supplemented with information acquired from the extraction tool 514, such as device information and annotation. As output, the transistor level simulator 508 generates *.lib timing library 524 from measurement results for the instance based approach.

The shown process flow addresses the following issues:
 Netlist size reduction—On average the active net flow reduces the netlist size by 2x~8x.
 Simulation run time—On average the active net flow reduces the simulation run time by 2x~58x (Some of the simulations earlier didn't even complete).
 Accuracy isn't compromised—The accuracy has been well within 3% with the flow.

Accordingly, this process addresses pitfalls associated with the instance based characterization approach without sacrificing accuracy.

Figure 6:
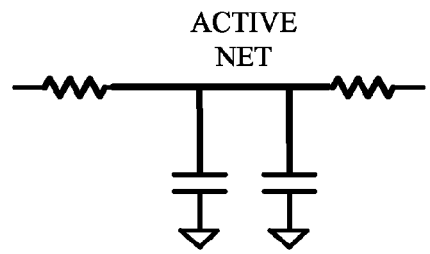
FIG. 6 is an example of how to extract a parasitic netlist from a limited part of the layout, determined by the active netlist, in which the parasitic capacitances are directly coupled between an active net and ground.

FIG. 6 is an example of how to extract a parasitic netlist from a limited part of the layout, determined by the active netlist, in which the parasitic capacitances are directly coupled between an active net and ground.

The netlist size is smallest and so runtime is the best. However, there is no glitch propagation on the coupled nets or capacitance loading.

Figure 7:
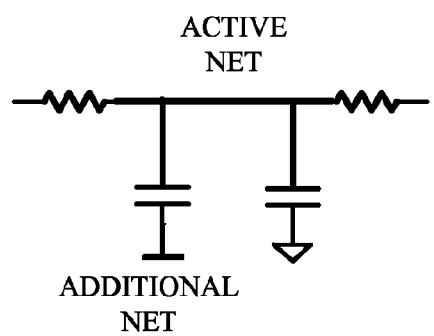
FIG. 7 is an example of how to extract a parasitic netlist from a limited part of the layout, determined by the active netlist, in which the parasitic capacitances are coupled between an active net and an adjacent net, but the adjacent net does not have additional parasitic capacitances.

FIG. 7 is an example of how to extract a parasitic netlist from a limited part of the layout, determined by the active netlist, in which the parasitic capacitances are coupled between an active net and an adjacent net, but the adjacent net does not have additional parasitic capacitances.

Runtime is slightly higher because of the coupled capacitors. However, for the coupled nets, glitch propagation is poor.

Figure 8:
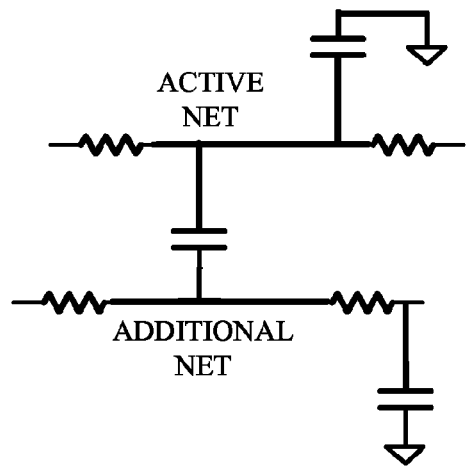
FIG. 8 is an example of how to extract a parasitic netlist from a limited part of the layout, determined by the active netlist, in which the extracted parasitics include complete resistances and capacitances of the active nets and the adjacent nets.

FIG. 8 is an example of how to extract a parasitic netlist from a limited part of the layout, determined by the active netlist, in which the extracted parasitics include complete resistances and capacitances of the active nets and the adjacent nets.

The netlist size is largest and so runtime is the worst. Glitch propagation is accurate on the coupled nets.

Figure 9:
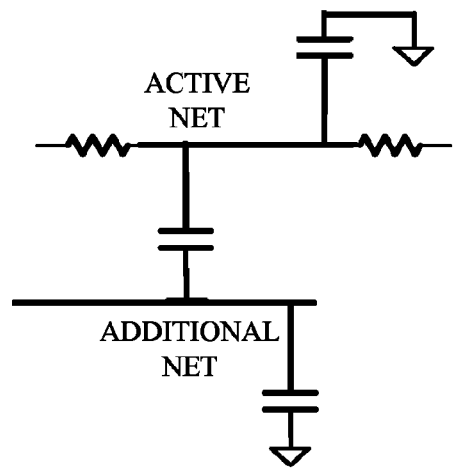
FIG. 9 is an example of how to extract a parasitic netlist from a limited part of the layout, determined by the active netlist, in which the extracted parasitics include complete resistances and capacitances of the active nets, but the extracted parasitics of the adjacent nets include capacitances only.

FIG. 9 is an example of how to extract a parasitic netlist from a limited part of the layout, determined by the active netlist, in which the extracted parasitics include complete resistances and capacitances of the active nets, but the extracted parasitics of the adjacent nets include capacitances only.

The netlist size is larger than FIGS. 6 and 7, and smaller than FIG. 8. Glitch propagation and capacitive loading is better than FIGS. 6 and 7 and worse than FIG. 8.

The following table illustrates the improvements of some embodiments of the technology.

The following four different memory configurations are tested:
 ST—Short Thin (Depth of the memory isn't high and width isn't large) e.g.—8 k deepx8 bit wide memory
 SF—Short Fat (Depth of the memory isn't high but width is large) e.g. 8 k deepx32 bit wide memory
 TT—Tall Thin (Depth of the memory is high but width isn't large) e.g. 64 k deepx8 bit wide memory
 TF—Tall Fat (Depth of the memory is high and width is large) e.g. 64 k deepx32 bit wide memory The different memory configurations have the following different runs:
 Active net extracted DSPF simulated as a netlist—DSPF as netlist
 Active net extracted DSPF back annotated as DSPF and device back annotated by SBA–SBA+DSPF BA
 All net extracted DSPF simulated as a netlist—DSPF as netlist
 All net extracted DSPF back annotated as DSPF and device back annotated by SBA–SBA+DSPF BA

| Config | Run Time | DSPF | # of Nets | Comments | SBA Matching |
|---|---|---|---|---|---|
| ST | 96 | ActiveNet | 1754 | SBA + DSPFBA | 97% |
|  | 222 | ActiveNet |  | DSPFasNetlist |  |
|  | 168 | AllNet | 1841 | SBA + DSPFBA | 98% |
|  | 217 | AllNet |  | DSPFasNetlist |  |
| SF | 2629 | ActiveNet | 15975 | SBA + DSPFBA | 98% |
|  | 8583 | ActiveNet |  | DSPFasNetlist |  |
|  | 2748 | AllNet | 16160 | SBA + DSPFBA | 99% |
|  | 8031 | AllNet |  | DSPFasNetlist |  |
| TT | 1498 | ActiveNet | 5448 | SBA + DSPFBA | 95% |
|  | 4754 | ActiveNet |  | DSPFasNetlist |  |
|  | 1758 | AllNet | 13711 | SBA + DSPFBA | 95% |
|  | 6581 | AllNet |  | DSPFasNetlist |  |
| TF | 2320 | ActiveNet | 50556 | SBA + DSPFBA | 98% |
|  | 4690 | ActiveNet |  | DSPFasNetlist |  |
|  | 44540 | AllNet | 149353 | SBA + DSPFBA | 99% |
|  | 270645 | AllNet |  | DSPFasNetlist |  |

The DSPF is simulated as a netlist and is considered golden, as none of the simulator optimizations technologies are applied. The DSPF that in this exercise contains the net parasitics information and device information. But in terms of performance the DSPF netlist simulation is always slower.

DSPF back annotation flow improves performance compared to a DSPF flat netlist run. "SBA+DSPF BA" means "net extracted DSPF back annotated as DSPF and device back annotated by SBA". In this case the parasitics extracted as DSPF are back annotated to a schematic netlist. SBA is first performed on the schematic netlist to transfer the layout connectivity to a schematic and back annotate the net parasitics onto the SBA completed netlist.

SF (short fat) takes longer than TT (tall thin). Each bit in memory is represented by 6 Transistors in the case of SRAM. In the example of 2 memories with same depth but width of one being 4x the other one, the memory config with 4x width actually results in 4x increase in device count, and hence SF memory run time is larger than TT run time.

The "SBA Matching" column indicates a percentage of the devices from schematic matching layout devices, and is an indication about the quality of correlation between schematic netlist and the DSPF. The SBA algorithm associates each schematic devices with the postlayout device or devices. It is an equivalent of an LVS (Layout vs. schematic algorithm). This algorithm has the following advantages 1. Helps customer maintain hierarchical database
2. Simulation database is the same as layout (Ideal as layout database is considered golden)
3. Helps in complete DSPF back annotation.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A circuit design method for use by a computer system having a processor and memory, comprising:
    the computer system identifying active nets in a netlist of a circuit design by performing simulation of the netlist, the active nets including nets that made a minimum voltage transition during the simulation and excluding other nets that did not make the minimum voltage transition during the simulation;
    the computer system extracting, from a layout of the circuit design, a parasitic netlist of a limited part of the circuit design, the limited part determined by the active nets;
    the computer system performing additional simulation of the circuit design including the netlist of a circuit design and the parasitic netlist of the limited part of the circuit design.

2. The method of claim 1,
    wherein the minimum voltage transition is of a predetermined fraction of a supply voltage of the circuit design during said identifying.

3. The method of claim 1,
    wherein the minimum voltage transition is specified by a HSIMALLOWEDDV command.

4. The method of claim 1,
    wherein the limited part is determined by the active nets such that the parasitic netlist includes parasitics of the active nets.

5. The method of claim 1,
    wherein the limited part is determined by the active nets such that the parasitic netlist includes parasitic grounded capacitances of the active nets.

6. The method of claim 1,
    wherein the limited part is determined by the active nets such that the parasitic netlist includes parasitic coupled capacitances of the active nets.

7. The method of claim 1,
    wherein the limited part is determined by the active nets such that the parasitic netlist includes parasitics of the active nets and parasitics of additional nets, the additional nets being next to the active nets.

8. The method of claim 1,
    wherein the limited part is determined by the active nets such that the parasitic netlist includes parasitic resistance and parasitic capacitance of the active nets and parasitic capacitance of additional nets directly connected to the parasitics of the active nets, the additional nets being next to the active nets.

9. The method of claim 1,
    wherein the limited part is determined by the active nets such that the parasitic netlist includes parasitic resistance and parasitic capacitance of the active nets and parasitic capacitance of additional nets directly connected to the parasitics of the active nets.

10. The method of claim 1,
    wherein the circuit design is a memory.

11. A circuit design method for use by a computer system having a processor and memory, comprising:
    the computer system performing simulation of a circuit design including a netlist of the circuit design and a parasitic netlist of a limited part of the circuit design, the limited part being determined by active nets of a netlist of the circuit design, the active nets including nets that made a minimum voltage transition during earlier simulation and excluding other nets that did not make the minimum voltage transition during the earlier simulation, and the parasitic netlist of the limited part of the circuit design being extracted from a layout of the circuit design.

12. The method of claim 11,
    wherein the active nets include nets having a minimum voltage transition of a predetermined minimum magnitude during said identifying.

13. The method of claim 11,
    wherein the active nets include nets having a minimum voltage transition of a minimum magnitude of a predetermined fraction of a supply voltage of the circuit design during said identifying.

14. The method of claim 11,
    wherein the active nets include nets having a minimum voltage transition of a minimum magnitude specified by a HSIMALLOWEDDV command.

15. The method of claim 11,
    wherein the limited part is determined by the active nets such that the parasitic netlist includes parasitics of the active nets.

16. The method of claim 11,
    wherein the limited part is determined by the active nets such that the parasitic netlist includes parasitic grounded capacitances of the active nets.

17. The method of claim 11,
    wherein the limited part is determined by the active nets such that the parasitic netlist includes parasitic coupled capacitances of the active nets.

18. The method of claim 11,
    wherein the limited part is determined by the active nets such that the parasitic netlist includes parasitics of the active nets and parasitics of additional nets, the additional nets being next to the active nets.

19. The method of claim 11,
    wherein the limited part is determined by the active nets such that the parasitic netlist includes parasitic resistance and parasitic capacitance of the active nets and parasitic capacitance of additional nets directly connected to the parasitics of the active nets, the additional nets being next to the active nets.

20. The method of claim 11,
    wherein the limited part is determined by the active nets such that the parasitic netlist includes parasitic resistance and parasitic capacitance of the active nets and parasitic capacitance of additional nets directly connected to the parasitics of the active nets.

21. The method of claim 11,
wherein the circuit design is a memory.

22. A nontransitory computer readable medium storing computer instructions to perform a circuit design method for use by a computer system, the computer instructions comprising:

computer instructions executable by the computer system identifying active nets in a netlist of a circuit design by performing simulation of the netlist, the active nets including nets that made a minimum voltage transition during the simulation and excluding other nets that did not make the minimum voltage transition during the simulation;

computer instructions executable by the computer system extracting, from a layout of the circuit design, a parasitic netlist of a limited part of the circuit design, the limited part determined by the active nets;

computer instructions executable by the computer system performing additional simulation of the circuit design including the netlist of a circuit design and the parasitic netlist of the limited part of the circuit design.

23. A nontransitory computer readable medium storing computer instructions to perform a circuit design method for use by a computer system, the computer instructions comprising:

computer instructions executable by the computer system performing simulation of a circuit design including a netlist of the circuit design and a parasitic netlist of a limited part of the circuit design, the limited part being determined by active nets of a netlist of the circuit design, the active nets including nets that made a minimum voltage transition during earlier simulation and excluding other nets that did not make the minimum voltage transition during the earlier simulation, and the parasitic netlist of the limited part of the circuit design being extracted from a layout of the circuit design.

24. A computer system, comprising:
processing resources;
memory resources;
computer instructions in the memory resources executable by the processing resources of the computer system identifying active nets in a netlist of a circuit design by performing simulation of the netlist, the active nets including nets that made a minimum voltage transition during the simulation and excluding other nets that did not make the minimum voltage transition during the simulation;

computer instructions in the memory resources executable by the processing resources of the computer system extracting, from a layout of the circuit design, a parasitic netlist of a limited part of the circuit design, the limited part determined by the active nets;

computer instructions in the memory resources executable by the processing resources of the computer system performing additional simulation of the circuit design including the netlist of a circuit design and the parasitic netlist of the limited part of the circuit design.

25. A computer system, comprising:
processing resources;
memory resources;
computer instructions in the memory resources executable by the computer system performing simulation of a circuit design including a netlist of the circuit design and a parasitic netlist of a limited part of the circuit design, the limited part being determined by active nets of a netlist of the circuit design, the active nets including nets that made a minimum voltage transition during earlier simulation and excluding other nets that did not make the minimum voltage transition during the earlier simulation, and the parasitic netlist of the limited part of the circuit design being extracted from a layout of the circuit design.

* * * * *